Patented Jan. 29, 1952

2,584,024

UNITED STATES PATENT OFFICE 2,584,024

2,4,5-TRIAMINO-6-ALKOXY PYRIMIDINES AND PROCESS OF PREPARING SAME

Edward A. Kaczka, Elizabeth, and Karl Folkers, Plainfield, N. J., assignors to Merck & Co., Inc., Rahway, N. J., a corporation of New Jersey No Drawing. Application August 21, 1948, Serial No. 45,554

14 Claims. (Cl. 260—256.4)

This invention is concerned with novel processes for manufacturing intermediates useful in the synthesis of folic acid. More particularly it relates to the novel 2,4,5-triamino-6-alkoxy-pyrimidines and to the preparation of these materials from readily available starting materials.

These novel 2,4,5-triamino - 6 - alkoxypyrimidines can be represented by the following structural formula:

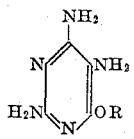

wherein R is a lower alkyl radical.

In contrast to the previously known 2,4,5-triamino-6-hydroxypyrimidine which is extremely insoluble and unstable except in the form of its salts, we have discovered that these novel 2,4,5-triamino-6-alkoxypyrimidines are much more soluble and are relatively stable compounds. In view of these unexpected and advantageous properties possessed by the novel 2,4,5-triamino-6-alkoxypyrimidine, the latter substances have been found to be much better suited than the 2,4,5-triamino-6-hydroxy-pyrimidines for carrying out subsequent reactions to produce folic acid and other compounds having valuable physiological properties.

It is now discovered that these novel 2,4,5-triamino-6-alkoxypyrimidine compounds can be prepared as follows: a 2,4-diamino-6-halopyrimidine is reacted with a lower aliphatic alcohol in the presence of an alkali metal alcoholate to produce the corresponding 2,4-diamino-6-alkoxypyrimidine which is treated with nitrous acid at a low temperature to produce the corresponding 2,4-diamino-5-nitroso-6-alkoxypyrimidine. This compound is then catalytically hydrogenated by treating a suspension of said 2,4-diamino-5-nitroso-6-alkoxypyrimidine in a lower aliphatic alcohol with hydrogen to produce the desired 2,4,5-triamino-6-alkoxypyrimidine. These reactions may be chemically represented as follows:

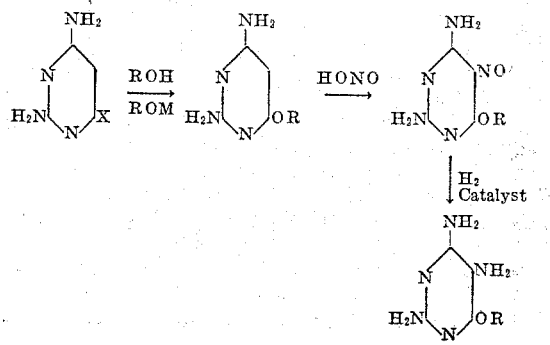

wherein $x$ is a halogen, M is an alkali metal and R is a lower alkyl radical.

In carrying out the presently invented process, a 2,4-diamino-6-halopyrimidine, such as 2,4-diamino-6-chloropyrimidine, is dissolved in a lower aliphatic alcohol containing an excess of the corresponding alkali metal alcoholate and the solution is heated until the reaction is complete. The reaction mixture is ordinarily heated at the reflux temperature under which conditions the reaction is complete in about 1 hour's time. The reaction mixture is filtered to remove the precipitated alkali metal chloride and the filtrate is evaporated to dryness to yield crude 2,4-diamino-6-alkoxypyrimidine. This product can be purified by recrystallization from hot water if desired.

Any lower aliphatic alcohol such as methanol, ethanol, propanol, and the like, and the corresponding alkali metal alcoholate, such as sodium methylate, sodium ethylate, potassium ethylate, and the like, can be used in this process. It is ordinarily preferred to employ a sodium alcoholate.

We have found that the conditions generally used successfully for the nitrosation of 2,4-diamino-6-hydroxy-pyrimidine, when applied to 2,4 - diamino - 6 - alkoxypyrimidine, caused hydrolysis and failed to give the desired 2,4-diamino-5-nitroso-6 - alkoxypyrimidine. However, we have discovered that it is possible to prepare 2,4-diamino - 5 - nitroso-6-alkoxypyrimidines in good yield from the corresponding 2,4-diamino-6-alkoxypyrimidine by conducting the nitrosation reaction at a temperature within the range of about 25–30° C.

In carrying out this nitrosation reaction, the 2,4-diamino-6-alkoxypyrimidine, produced as described above, is dissolved in an aqueous acid solution at a temperature below about 30° C. A solution of a nitrite salt is added to the solution containing the pyrimidine compound while maintaining the temperature between 25° C. and 30° C. Any strong inorganic, non-oxidizing acid, such as sulfuric acid, hydrochloric acid, and the like, can be employed for the acid component, and any nitrite is satisfactory. It is ordinarily preferred to use aqueous sulfuric acid in conjunction with a saturated solution of sodium nitrite. The addition of the solution containing the nitrite salt, which is ordinarily carried out dropwise and with agitation, is continued until the reaction is complete, as evidenced by the fact that no further precipitate forms upon adding the nitrite solution to the supernatant liquid. Additional acid is added during the reaction, if necessary in order to maintain the pH of the reaction mixture in the range of about 4 to 6. The precipitated material is then recovered by filtration, washed thoroughly with water and dried to produce 2,4-diamino-5-nitroso-6-alkoxypyrimidine.

The latter compound is then reacted with hydrogen, said reaction being carried out by treating a suspension of said 2,4-diamino-5-nitroso-6-alkoxypyrimidine in a lower aliphatic alcohol with hydrogen in the presence of a catalyst such as palladium, platinum or Raney nickel. It is ordinarily preferred to carry out the reaction at a temperature of about 30° C. and employing a palladium metal catalyst. The catalyst can be employed alone or in conjunction with a carrier such as activated charcoal. After the hydrogenation reaction is complete (i. e. after two equivalents of hydrogen have been absorbed) the catalyst is quickly removed by filtration and the product recovered from the filtrate. The 2,4,5-triamino-6-alkoxypyrimidine can be obtained direct by evaporating the alcoholic solution and drying the residual material; the operation should be carried out rapidly, or in the absence of air, since the triamine is sensitive to oxidation. Alternatively, the filtrate after removal of the catalyst can be treated with an alcoholic solution of hydrogen chloride to produce the corresponding dihydrochloride of 2,4,5-triamino-6-alkoxypyrimidine.

It is surprising that the desired 2,4,5-triamino-6-alkoxypyrimidine is obtained in good yield by hydrogenation of the corresponding 2,4-diamino-5-nitroso-6-alkoxypyrimidine since it might be expected that hydrogenation of the double bonds in the pyrimidine ring might also take place. It is indeed unexpected that this selective hydrogenation reaction can be achieved by carrying out the hydrogenation in the presence of a lower aliphatic alcohol solvent, since the 2,4-diamino-5-nitroso-6-alkoxypyrimidine starting material is substantially insoluble in lower aliphatic alcohols.

The following examples illustrate methods of carrying out the present invention, but it is to be understood that these examples are given by way of illustration and not of limitation.

Example 1

2 gms. of 2,4-diamino-6-chloropyrimidine were dissolved in 50 ml. of methanol containing 0.0435 mole of sodium methylate. The resulting solution was heated under reflux for 1 hour and then filtered to remove the sodium chloride which had precipitated. The filtrate was evaporated to dryness and the residual material treated with water to yield 2,4-diamino-6-methoxypyrimidine; M. P. 140–145° C. (micro block).

Example 2

1 gm. of 2,4-diamino-6-chloropyrimidine was dissolved in 20 ml. of ethanol and the solution was added to a solution of 0.0435 mole of sodium ethylate dissolved in 40 ml. of ethanol. The resulting solution was heated to reflux for 4.5 hours and then filtered to remove the sodium chloride which had precipitated. The filtrate was evaporated to dryness and the residual material crystallized from hot water to produce dense crystals of 2,4-diamino-6-ethoxypyrimidine; M. P. 160° C. (micro block). Anal.: Calc'd for $C_6H_{10}N_4O$: C, 46.74; H, 6.54; found: C, 46.16; H, 6.24.

Example 3

1 gm. of 2,4-diamino-6-ethoxypyrimidine was added to 50 ml. of water and then 2 ml. of 50% aqueous sulfuric acid was added to this solution with stirring. A saturated solution of sodium nitrite was added dropwise to the solution with stirring, during which time the temperature of the reaction solution was maintained at 25–30° C. After the addition of 2 or 3 drops of the nitrite solution, a deep violet precipitate began to form. The sodium nitrite solution was added until a sample of the supernatant liquid gave no further precipitate. The solution was maintained at a pH of 4–6 by the addition of 50% aqueous sulfuric acid solution. The deep violet product was collected by centrifugation, washed with water and dried to produce 2,4-diamino-5-nitroso-6-ethoxypyrimidine. Anal.: Calc'd for $C_6H_9N_5O_2$: C, 39.34; H, 4.95; found: C, 38.98; H, 5.01.

Example 4

97 mg. of 2,4-diamino-5-nitroso-6-ethoxypyrimidine was suspended in 50 ml. of methanol. 1 gm. of a catalyst containing 5% palladium and consisting of palladium dispersed on activated charcoal (Darco G–60) was added to the solution and the mixture was shaken under hydrogen at atmospheric pressure at a temperature of 30° C. until two equivalents of the hydrogen had been absorbed. The catalyst was removed and the clear, colorless solution evaporated to dryness. The residual material was dissolved in methanol and the methanolic solution was saturated with anhydrous hydrogen chloride. The solution was evaporated to dryness and the residual material recrystallized from methanol by the addition of ethanol to produce substantially pure 2,4,5-triamino-6-ethoxypyrimidine dihydrochloride; M. P. 160° C. dec. (micro block). Anal.: Calc'd for $C_6H_{11}N_5O \cdot 2HCl$: C, 29.76; H, 5.41; N, 28.93; found: C, 31.06; H, 5.71; N, 30.19.

Example 5

12.5 gms. of 2,4-diamino-5-nitroso-6-ethoxypyrimidine were suspended in 215 ml. of ethanol. 4 gms. of a hydrogenation catalyst containing 5% palladium and consisting of palladium dispersed on activated charcoal (Darco G–60) was added to the solution and the mixture was shaken under hydrogen at 15 to 44 lbs. pressure at a temperature of about 30° C. until two equivalents of hydrogen had been absorbed. The catalyst was removed by filtration. On cooling the clear, colorless ethanol solution, slender needles began to form. When crystallization was complete, the crystalline product was separated by filtration and the product quickly washed with cold ethanol and dried in vacuo to produce 4.2 gms. of 2,4,5-triamino-6-ethoxypyrimidine; M. P. 130–133° C. (micro block). Anal.: Calc'd for $C_6H_{11}N_5O$: C, 42.59; H, 6.56; N, 41.40; ethoxyl, 26.6; found: C, 42.78; H, 6.33; N, 41.16; ethoxyl, 27.1.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting 2,4-diamino-6-alkoxy-pyrimidine with nitrous acid at a temperature between 25 and 30° C. and treating the suspension of the resulting product in a lower aliphatic alcohol with hydrogen in the presence of a hydrogenation catalyst to produce the corresponding 2,4,5-triamino-6-alkoxypyrimidine.

2. The process which comprises reacting 2,4-diamino-6-ethoxypyrimidine with nitrous acid at a temperature between 25 and 30° C. and treating a suspension of the resulting product in ethanol with hydrogen in the presence of a palladium catalyst to produce 2,4,5-triamino-6-ethoxypyrimidine.

3. The process which comprises reacting 2,4-diamino-6-ethoxy-pyrimidine with nitrous acid at a temperature between 25 and 30° C., treating a suspension of the resulting product in methanol with hydrogen in the presence of a palladium catalyst, and reacting the hydrogenation product, after separation of the catalyst, with methanolic hydrogen chloride to produce 2,4,5-triamino-6-ethoxypyrimidine dihydrochloride.

4. The process of preparing 2,4-diamino-5-nitroso-6-alkoxypyrimidine which comprises reacting 2,4-diamino-6-alkoxypyrimidine with nitrous acid at a temperature between 25 and 30° C.

5. The process of preparing 2,4-diamino-5-nitroso-6-ethoxypyrimidine which comprises reacting 2,4-diamino-6-ethoxypyrimidine with nitrous acid at a temperature between 25 and 30° C.

6. The process of preparing 2,4,5-triamino-6-alkoxypyrimidine which comprises reacting 2,4-diamino-5-nitroso-6-alkoxypyrimidine with hydrogen, said reaction being carried out by bringing hydrogen gas under pressure in contact with a suspension, in a lower aliphatic alcohol, of said 2,4-diamino-5-nitroso-6-alkoxypyrimidine and a hydrogenation catalyst.

7. The process of preparing 2,4,5-triamino-6-ethoxypyrimidine which comprises reacting 2,4-diamino-5-nitroso-6-ethoxypyrimidine with hydrogen at a temperature of approximately 30° C. said reaction being carried out by bringing hydrogen gas under pressure into contact with a suspension, in ethanol, of said 2,4-diamino-5-nitroso-6-alkoxypyrimidine and a palladium catalyst.

8. The process of preparing 2,4,5-triamino-6-ethoxypyrimidine dihydrochloride which comprises reacting 2,4-diamino-5-nitroso-6-ethoxypyrimidine with hydrogen at a temperature of approximately 30° C., said reaction being carried out by bringing hydrogen gas under pressure into contact with a suspension, in methanol, of said 2,4-diamino-5-nitroso-6-ethoxypyrimidine and a catalyst comprising palladium dispersed on activated charcoal, and reacting the hydrogenation product, after separation of the catalyst, with methanolic hydrogen chloride.

9. 2,4-diamino-5-nitroso-6 - alkoxypyrimidines.
10. 2,4-diamino-5-nitroso-6- ethoxypyrimidine.
11. 2,4,5-triamino-6-alkoxypyrimidines.
12. 2,4,5-triamino-6-ethoxypyrimidine.
13. 2,4,5-triamino-6-ethoxypyrimidine dihydrochloride.
14. Compounds having the formula:

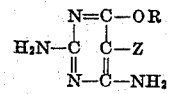

wherein Z is a radical selected from the class which consists of nitroso and amino radicals, and R is an alkyl radical.

EDWARD A. KACZKA.
KARL FOLKERS.

REFERENCES CITED

The following references are of record in the file of this patent:

UNITED STATES PATENTS

| Number | Name | Date |
|---|---|---|
| 2,447,523 | Mozingo et al. | Aug. 24, 1948 |

OTHER REFERENCES

Johnson et al.: Chem. Reviews 13, 225 and 261 (1933).

Rose et al.: J. Chem. Soc. (1946) 81–5.

Bobranski et al.: J. Am. Pharm. Assn. (Science Edition) 37, 62–64 (1948).